INVENTORS:
DONALD R. ALBRIGHT,
WILLIAM B. JACKSON,

THEIR ATTORNEY.

United States Patent Office 3,506,914
Patented Apr. 14, 1970

3,506,914
METHOD AND APPARATUS FOR DETECTING ROTOR FLUX VARIATIONS IN THE AIR GAP OF A DYNAMOELECTRIC MACHINE
Donald R. Albright, Scotia, and William B. Jackson, Schenectady, N.Y., assignors to General Electric Company, a corporation of New York
Filed July 1, 1968, Ser. No. 741,786
Int. Cl. G01r 31/02
U.S. Cl. 324—51    8 Claims

ABSTRACT OF THE DISCLOSURE

In a dynamoelectric machine with a rotating field winding, a probe is disposed in the air gap close to the rotor surface to monitor variations in leakage flux density. The apparatus is useful in detecting shorted turns in the field winding.

BACKGROUND OF THE INVENTION

In large dynamoelectric machines such as turbine-generators, the rotating field comprises a series winding disposed in longitudinal slots along a cylindrical rotor. The purpose of the winding is to generate a fundamental flux which rotates at synchronous speed with the rotor and links the stationary armature winding.

On rare occasions, it is possible to develop a shorted turn in the field winding which can cause thermal and magnetic unbalance in the rotor, leading to other complications. Because the variation in resistance represented by one shorted turn out of a field winding of, say, 200 turns, represents only ½%, the existence of a shorted turn is difficult to determine by resistance measurement. Moreover, the turn may only be shorted while the rotor is turning at high speed and the windings are subjected to centrifugal force and to forces resulting from normal operating temperatures.

Previously, the main or fundamental flux generated by the field winding has been monitored by means of an auxiliary coil arranged to be linked by all or part of the fundamental flux, so as to provide a comparative measurement. One prior art arrangement consists of a coil disposed in a radial plane and enclosing a short axial length of the stator magnetic core. Such a coil measures the rate of change of total flux passing through a section of the core and is useful for determining core density wave shape. It is of little value, however, for indicating local variations in the rotor flux which might result from shorted turns.

Another prior art arrangement consists of a small coil mounted on a stator wedge and disposed in a plane oriented normal to a radial line from the rotor axis. Such a coil measures the local rate of change of fundamental rotor flux passing radially across the air gap at one peripheral location. It provides some improvement in sensitivity in terms of variations in fundamental flux density, but with present day air gaps approaching three to five inches, it is not adequate for detecting variations due to shorted turns.

Accordingly, one object of the invention is to provide an improved method and apparatus for detecting local flux density irregularities in the air gap.

Another object of the invention is to provide an improved method for detecting and locating shorted turns in the field winding.

DRAWING

Figures 1, 1A:
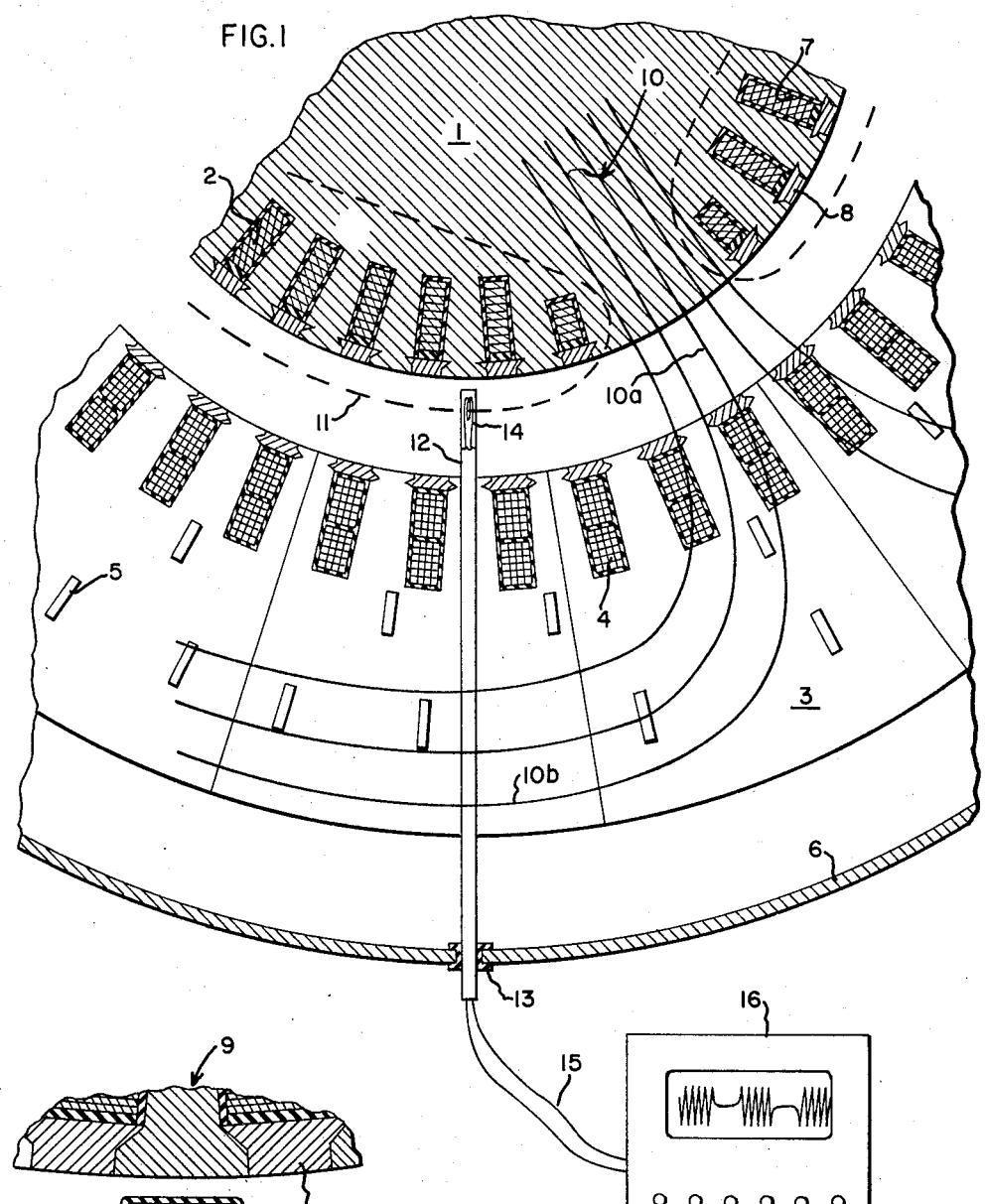

Other objects, advantages and features of the present invention will become apparent from the following description of one embodiment thereof when taken in connection with the accompanying drawing, in which:

FIG. 1 is a schematic cross section taken through a portion of the rotor and stator of a dynamoelectric machine, FIG 1a is an enlarged cross section of a portion of the probe shown in FIG. 1 and FIGS. 2a through 2d represent a schematic developed view of the rotor periphery and a series of corresponding graphs.

SUMMARY OF THE INVENTION

Briefly stated, the invention is practiced by disposing a probe in the air gap oriented so as to link a component of the slot leakage flux near the rotor surface. The voltage variations in the coil can be displayed on an oscilloscope having a sweep synchronized to the speed of the rotor.

DESCRIPTION

Referring now to FIG. 1 of the drawing, a rotating field element comprises a cylindrical rotor 1 having a field winding 2 and disposed to rotate within the bore of a stator core 3. Stator core 3 comprises a number of punchings aligned to provide slots in which are disposed the main windings 4. At intervals along the stator core, the punchings are separated by spacers 5 to provide passage for cooling gas. The core 3 is disposed in a gas-tight casing 6.

The field winding 2 is a series winding supplied by a suitable DC excitation source and includes insulated conductors stacked in slots 7 circumferentially spaced around the cylindrical rotor. The windings are held in place by wedges 8 and are arranged in concentric coils around a pole portion 9 of the rotor. Each coil, therefore, is disposed in a pair of slots centered about the pole 9. Each such coil contains a number of turns which can range from 4 to 20, for example.

The aforesaid field winding produces a fundamental flux indicated by flux lines 10. This flux includes a portion 10a crossing the air gap in a radial direction and a portion 10b passing radially and circumferentially through the stator core laminations.

Although the production of the fundamental flux 10 is the main purpose of the rotating field element, other flux paths are also present which produce no useful voltage and are generally considered wasted leakage paths. One of these paths is a secondary leakage flux resulting from the fact that all of the rotor winding coil sides on one side of the pole carry current in the same direction. The leakage flux is depicted schematically in FIG. 1 by lines 11 extending generally in a peripheral direction through the air gap. The leakage flux, which never reaches the stator core, is to be distinguished from the fundamental flux 10 crossing the air gap and passing in a generally peripheral direction through the stator core.

The leakage flux density is non-uniform. It rises and falls from slot to slot and its value also depends upon the number of active turns in the particular slot as will be explained later in detail.

In accordance with the invention, a probe 12 is disposed in the air gap terminating about ¼" to ¾" from the rotor surface. The probe is inserted radially inward, through a cooling duct for convenience, into the air gap and is provided with a suitable gland seal 13 through the gas-tight generator wall 6. Inside the probe is a small search coil 14 connected by exterior leads 15 to an oscilloscope 16.

Coil 14 is arranged to link a component of leakage flux 11. One arrangement which is quite successful is shown in FIG. 1 where the coil is oriented to link the peripheral component of leakage flux 11. This is done by disposing coil 14 so that the turns lie in a plane which extends both axially and radially with respect to the rotor axis, known hereinafter as a "radial plane." However, the coil may also successfully be oriented to link other selected components of the leakage flux, such as the radial component, or additional coils may serve this purpose, as explained in connection with FIG. 1a.

FIG. 1a is an enlarged cross-sectional view of the end of a typical probe 12. It is constructed of non-magnetic material, such as stainless steel or a suitable plastic, and is gas tight to prevent escape of cooling gas from the generator. A small flat coil 14 is wound on a form 17 and is oriented in a radial plane so as to detect changes in the peripheral component of leakage flux. An additional supplementary coil 22 may also be included and is disposed in a plane normal to a radial line so as to link radial components of both fundamental and leakage flux.

OPERATION

Figure 2:
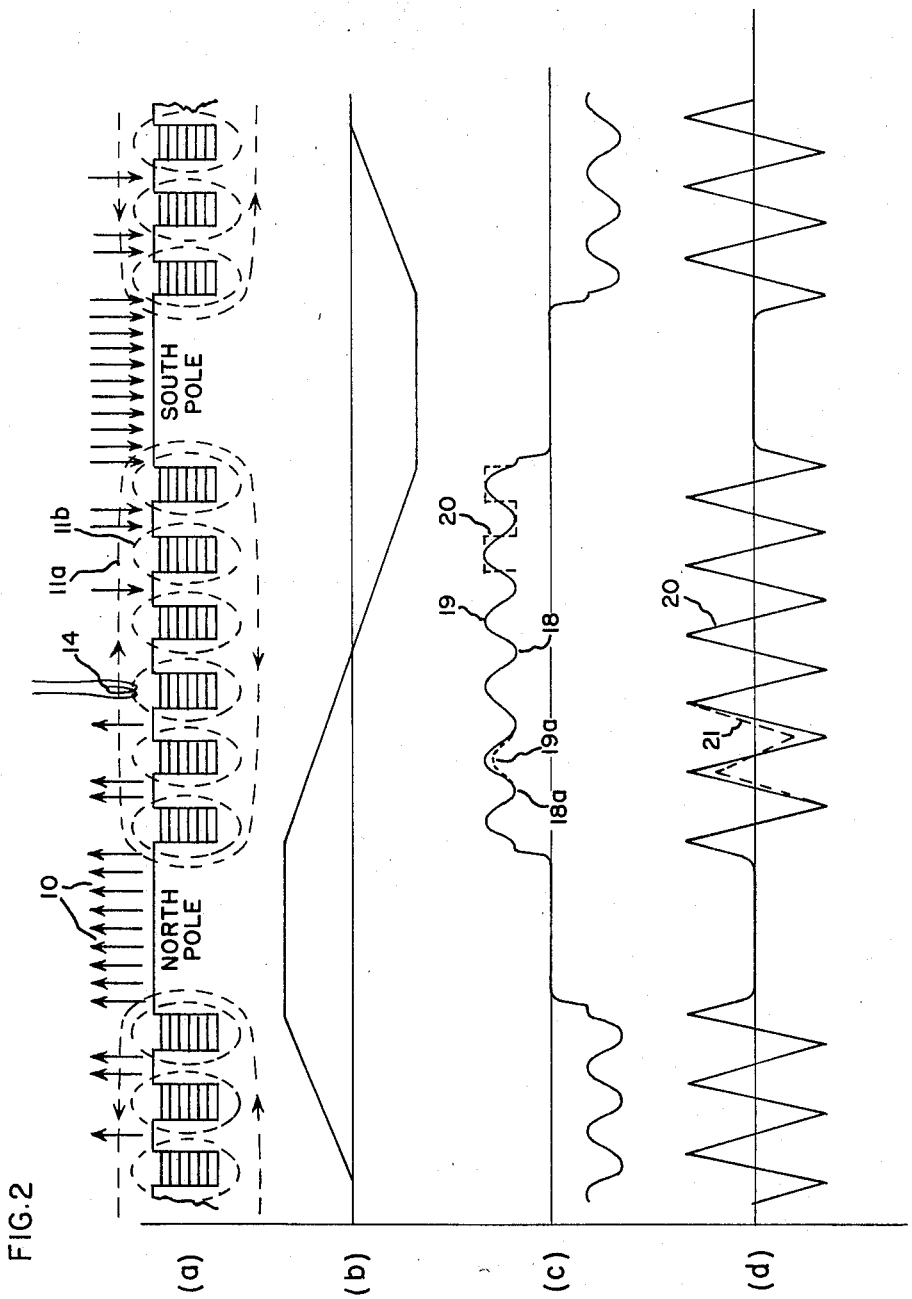

The operation of the invention will be better understood by reference to FIG. 2, wherein FIG. 2a represents a developed schematic view of the rotor periphery in a two-pole generator.

The fundamental flux lines 10 have a radial component crossing the air gap with a flux density which varies around the rotor as indicated in FIG. 2b. This flux component links coil 22 in a known manner but does not link coil 14 because of its orientation in the air gap.

Due to the fact that all of the coil sides of the rotor field 2 disposed between the north and south pole in FIG. 2a have current flowing in the same direction, a leakage flux 11 is produced in the air gap. This flux may be considered as having two components. The component indicated by lines 11a is an idealized representation of the constant portion of the linkage flux between the poles, having primarily a peripheral component in the air gap.

Leakage flux component 11b, which enables the operation of the present invention, represents the local changes in leakage flux density due to the fact that there are individual conductors disposed in the slots with magnetic teeth between them. Component 11b has both radial and peripheral components. Only the peripheral component, which is detectable by coil 14 is discussed in connection with FIG. 2.

A theoretical representation of the total variation in the peripheral component of the leakage flux density is indicated at FIG. 2c representing values at a slight distance from the rotor surface.

It will be apparent that FIG. 2c indicates a flux density variation or ripple due to varying component 11b which is superimposed on a relatively constant leakage flux density component 11a. The difference between the valleys 18 and crests 19 of the peripheral leakage flux density represents the difference in total peripheral flux density over a tooth and slot respectively. A theoretical distribution directly at the rotor surface would have an infinite rate of change and appear as a square wave 20. However, in a probe position slightly spaced from the rotor surface, the intensity varies more gradually from a minimum at point 18 to a maximum at point 19.

The total variation in component 11b is directly proportional to the number of active turns in the slot. For electrically and magnetically similar slots, the rate of change or differential of component 11b is also the same from slot to slot.

It follows from the foregoing that the peak peripheral flux density due to a shorted turn in a particular slot will appear as a reduced peak 19a on the graph. Therefore, it also follows that the rate of change or differential of the peripheral leakage flux corresponding to points 18a and 19a will be reduced near the location of a shorted turn.

FIG. 2d is a graph of the voltage produced by the search coil 14 when the rotor is rotating at constant speed. The voltage variations 20 are produced by the rate of change of peripheral flux. Due to the non-uniform density from slot to slot, local reductions of the peripheral flux density lead to reduced voltage variations as indicated by graph portion 21.

In the foregoing explanation, the coil 14 was used as illustrative. Its value lies in the fact that it is oriented in a radial plane so that it is not linked by the fundamental rotor flux 10, but is linked by the peripheral compound of leakage flux 11. However, a coil such as 22 may also be useful for detecting shorted turns or checking the results because the probe allows it to be placed close enough to the rotor surface to link the radial component of leakage flux. Although the usefulness of coil 22 is limited somewhat by the fact that it also is linked by the much stronger fundamental flux 10, good results have been obtained despite the existence of a large air gap by placement close to the rotor surface.

It will be understood in connection with the foregoing description that the graphs of FIG. 2 represent theoretical conditions. The oscilloscope traces will vary depending upon whether the generator is being measured under short circuit, open circuit or full load conditions. Also, design variations in the magnetic circuit of the rotor will affect the interpretation to be given to the indications on the oscilloscope.

Therefore, in its preferred form, the invention is practiced in the following manner. The probe is positioned as indicated in FIG. 1 with the voltage leads of the probe coil connected to the oscilloscope. The sweep of the scope is synchronized to the speed of the rotor so as to obtain a picture of the voltage variations on the face of the scope (see FIG. 2d). Then, preferably a photograph is taken of the traces. With a permanent photographic record, the peaks can be analyzed with respect to adjacent peaks to determine the existence of a shorted turn.

A variation in the method of analysis consists in making a tracing of the photograph and inverting it so as to compare it with the peripheral flux variation on the opposite side of the rotor, which should be symmetrical in nature.

The sensitivity of the aforementioned probe in terms of detecting shorted turns is dependent upon the number of turns in the slot. The fewer the number of turns in the total rotor winding, the more useful the technique. The sensitivity is best under short-circuit condition, but the method may also be practiced under open circuit or under load.

By means of the foregoing invention, it is possible to detect and locate one or more shorted turns when the rotor is at speed. This may be carried out with very simple equipment while the generator is in operation.

Although the foregoing application is primarily with regard to coil 14, it will be understood that the invention extends to the positioning of a coil such as 22 in close proximity to the rotor surface by means of a gas-tight probe extending into the air gap.

While there is shown what is considered at present to be the preferred embodiment of the invention, it is of course understood that various other modifications may be made therein, and it is intended to cover in the appended claims all such modifications as fall within the true spirit and scope of the invention.

What we claim is:
1. Apparatus for detecting irregularities in rate of change of leakage flux of a field winding disposed on a slotted rotor rotating in the air gap of a dynamoelectric machine, comprising:
   a coil disposed entirely in the air gap and closely spaced to the rotor surface with respect to the size of said air gap, said coil being oriented to link selected components of leakage flux which vary from slot to slot, and
   means connected to indicate voltage variations in said coil.
2. The combination according to claim 1, including a gas-tight, non-magnetic probe extending into the dynamo- electric machine through a gas-tight gland seal and into the air gap, said coil being disposed in the end of the probe.

3. The combination according to claim 1 wherein said indicating means comprises an oscilloscope having its sweep synchronized with the speed of said rotor.

4. The combination according to claim 1 wherein said coil has turns disposed in a radial plane so as to link the peripheral component of said leakage flux.

5. The combination according to claim 1, wherein said coil has turns disposed in a plane normal to a radial line from the rotor axis so as to link the radial component of said leakage flux.

6. Apparatus for detecting shorted turns in a gas-tight dynamoelectric machine having a slotted rotor with a field winding thereon rotating in an air gap of greater than three inches in radial dimension, comprising:
 a gland seal disposed in the gas-tight generator wall,
 a hollow non-magnetic tube probe extending radially through the gland seal and into the air gap to a point on the order of ½" from the rotor surface,
 a coil disposed in the end of the probe and oriented to link a component of the field winding leakage flux which varies from slot to slot, and
 means connected to indicate voltage variations in said coil from slot to slot.

7. A method for detecting shorted turns in a field winding disposed on a slotted rotor rotating in the air gap of a dynamoelectric machine, comprising:
 inserting a coil-containing probe into the dynamoelectric air gap to a point closely spaced from the rotor,
 orienting said coil to link components of leakage flux between slots, and
 displaying the voltage variations in said coil on an oscilloscope having its sweep synchronized with the rotor speed.

8. The method according to claim 7, including the additional step of photographically recording the voltage variations displayed on said oscilloscope.

References Cited

UNITED STATES PATENTS

| 363,129 | 5/1887 | Easton | 324—51 |
| 2,103,179 | 12/1937 | Rennan | 324—52 |

RUDOLPH V. ROLINEC, Primary Examiner

R. J. CORCORAN, Assistant Examiner

U.S. Cl. X.R.

318—490